US007002585B1

(12) United States Patent
Watanabe et al.

(10) Patent No.: US 7,002,585 B1
(45) Date of Patent: Feb. 21, 2006

(54) GRAPHIC DISPLAY APPARATUS FOR ROBOT SYSTEM

(75) Inventors: Atsushi Watanabe, Tokyo (JP); Tetsuya Kosaka, Yamanashi (JP); Yoshiharu Nagatsuka, Yamanashi (JP)

(73) Assignee: Fanuc LTD, Yamanashi (JP)

( * ) Notice: Subject to any disclaimer, the term of this patent is extended or adjusted under 35 U.S.C. 154(b) by 890 days.

(21) Appl. No.: 09/688,042

(22) Filed: Oct. 12, 2000

(30) Foreign Application Priority Data

Oct. 12, 1999 (JP) ................................. 11-289508

(51) Int. Cl.
G06T 13/00 (2006.01)
G06T 15/70 (2006.01)

(52) U.S. Cl. ...................... 345/475; 345/420; 345/664; 901/3; 901/47; 318/568.11; 700/97; 700/182; 700/248; 700/264; 703/1; 703/7; 715/502

(58) Field of Classification Search ................ 703/1–3, 703/6–8; 345/419, 420, 473–475, 418, 421, 345/422, 664; 700/56, 97, 182, 245, 264, 700/257, 247–249; 901/3, 47; 318/568.11; 715/502

See application file for complete search history.

(56) References Cited

U.S. PATENT DOCUMENTS

| 4,633,409 | A |   | 12/1986 | Sekikawa ................... 700/183 |
| 4,868,766 | A | * | 9/1989  | Oosterholt ................... 345/420 |
| 5,488,689 | A | * | 1/1996  | Yamato et al. ............... 700/264 |
| 5,495,410 | A | * | 2/1996  | Graf ............................ 700/86 |
| 5,682,886 | A | * | 11/1997 | Delp et al. ................... 600/407 |
| 5,745,387 | A |   | 4/1998  | Corby, Jr. et al. .............. 703/1 |
| 5,880,956 | A |   | 3/1999  | Graf ............................ 700/86 |

(Continued)

FOREIGN PATENT DOCUMENTS

| EP | 0 604 661 A1 |   | 7/1994 |
| GB | 2 270 788 A |   | 3/1994 |
| JP | 60195615 A | * | 10/1985 |
| JP | 09212219 A | * | 8/1997 |
| JP | 2001105137 A | * | 4/2001 |

OTHER PUBLICATIONS

Marcelo H. Ang Jr. et al., "A walk-through programmed robot for welding in shipyards". The Industrial Robot, Bedford: 1999, vol. 26, Issue 5, p. 377.*

(Continued)

*Primary Examiner*—Anthony Knight
*Assistant Examiner*—Crystal J Barnes
(74) *Attorney, Agent, or Firm*—Staas & Halsey LLP

(57) ABSTRACT

3-D models of various types of objects such as a robot body, and a peripheral equipment, a machine, a part (workpiece), of the robot, are stored in an object library in advance. Dimension line data of an edge line of which dimension can be changed, and constraint condition for constraining coordinate positions of apexes which can be changed are also stored in the object library. A model having the shape corresponding to the shape of the object to be used is selected from the object library, and the dimension of the shape is set. The dimension of the selected model is modified so that the shape of the model corresponds to the shape of the actual object. Using the model of which dimension was adjusted, animation motion of the robot is formed on a display screen. With the above arrangement, it is possible to easily set and change object 3-D models relating to a robot motion.

13 Claims, 7 Drawing Sheets

U.S. PATENT DOCUMENTS 6,167,328 A * 12/2000 Takaoka et al. ............. 700/264
6,243,611 B1 * 6/2001 Hazama et al. ............... 700/97
6,330,495 B1 * 12/2001 Kaneko et al. ............. 700/264
6,642,922 B1 * 11/2003 Noda .......................... 345/419
2001/0018644 A1 * 8/2001 Schwalb et al. ............... 703/7

OTHER PUBLICATIONS

T. Kesavadas et al., "Flexible virtual tools for porgramming robotic finishing operations", The Industrial Robot, Bedford: 1998, vol. 25, Issue 4, p. 268.*

* cited by examiner

GRAPHIC DISPLAY APPARATUS FOR ROBOT SYSTEM

BACKGROUND OF THE INVENTION

1. Field of the Invention

The present invention relates to a graphic display apparatus for robot system used in off-line programming of a robot, in which a model of the robot displayed on a screen is caused to move in animation form.

2. Description of the Related Art

There is a conventionally known method in which a 3-D model of a robot is rendered on a screen, the rendered 3-D model of the robot is caused to move in animation based on a motion program inputted to the robot, and the motion by the teach program is checked and adjusted.

A motion simulation for moving the 3-D model of the robot in animation based on the teach program is useful for correction of a robot motion programming by checking the robot motion and detecting a relation between the robot motion and a peripheral device, a machine and a part (workpiece) relating to the robot operation.

In a conventional graphic display apparatus for a robot system for carrying out a simulation of the teach program by moving a 3-D model of a robot and peripheral device, machine and part related to a robot operation, there is a problem that when dimension of the peripheral device, the machine and the part related to the robot operation is changed, for example, whenever dimension of a tool to be mounted to the tip of a robot arm is changed or dimension of a part to which a sealing agent is applied or which is to be welded is changed, the 3-D model has to be newly created and registered.

SUMMARY OF THE INVENTION

It is an object of the present invention to provide a graphic display apparatus for robot system which allows an operator to easily create a shape model of a robot itself, a peripheral device, machine or a part of the robot, which is necessary to cause a model of the robot displayed on a screen to move in animation form.

To attain the above object, one embodiment of the graphic display apparatus for robot system according to the present invention comprises: means for displaying and arranging a 3-D model of a robot on a display screen to cause the displayed model to move in animation on the screen; means for storing the 3-D model of the robot and one or more of 3-D models of a peripheral equipment, a machine or a part, which is used in a system using the robot; and means for selecting one or more 3-D models stored in the storing means on the display screen.

Further the above graphic display apparatus for robot system comprises means for adjusting a dimensions of the 3-D model, selected by the selecting means, on the screen.

With this arrangement, the 3-D model of the robot of which dimensions was adjusted by the adjusting means, or the 3-D model of the robot and the 3-D model of a peripheral equipment, a machine or a part, which was selected by the selecting means, of which dimensions were adjusted by the adjusting means, are displayed and arranged on the display screen, so that at least a part of the system using the robot is approximated.

The other embodiment of the graphic display apparatus for robot system according to the present invention comprises: means for displaying and arranging a 3-D model of a robot on a display screen to cause the displayed model to move in animation on the screen; a first storing means for storing the 3-D model of the robot: a second storing means for storing one or more 3-D models of a peripheral equipment, a machine or a part, which is used in a system using the robot; means for selecting one or more 3-D models stored in the second storing means on the display screen; and means for adjusting a dimension of the 3-D model selected by the selecting means, on the screen.

With this arrangement, the 3-D model of the robot, and a the 3-D model of the peripheral equipment, the machine or the part, which was selected by the selecting means, of which dimension were adjusted by the adjusting means, are displayed and arranged on the display screen, so that at least a part of the system using the robot is approximated.

When the shape of the robot does not require so much change, a 3-D model of the robot whose dimension was already adjusted is stored, and this stored 3-D model is used for the robot.

The graphic display apparatus for robot system further comprises means for displaying, on the screen in animation, the robot motion corresponding to at least a portion of a robot program.

Especially, 3-D models of the peripheral equipment, the machine or the part are classified by kinds, a plurality of different types are displayed on the screen for each of the classified kinds, and a 3-D model is selected from the displayed types.

The graphic display apparatus for robot system further comprises means for adding a 3-D model of the peripheral equipment, the machine or the part of the robot in the storing means so as to meet a requirement of a newly added peripheral equipment, machine or part.

The graphic display apparatus for robot system further comprises a robot controller and means for sending and receiving information, and the shape of the 3-D model of the peripheral equipment, the machine or the part is adjusted based on position data. These data are obtained by moving the tool center point (TCP) of an actual robot to a plurality of positions which constitute characteristic features of an actual peripheral equipment, machine or the part corresponding to the 3-D model of the peripheral equipment, the machine or the part and then detecting these positions, or obtained by mounting a sensor on an actual robot and detecting the positions which constitute characteristic features of an actual peripheral equipment, machine or the part corresponding to the 3-D model of the peripheral equipment, the machine or the part.

Further, by capturing a plan view of layout of an operation system using a robot by means of a scanner or the like from outside, displaying the plan view on the screen, and arranging on the screen a 3-D model of the peripheral equipment, the machine or the part in correspondence with the layout, modeling of a production system is carried out using the robot.

DESCRIPTION OF THE PREFERRED EMBODIMENTS

Figure 1:
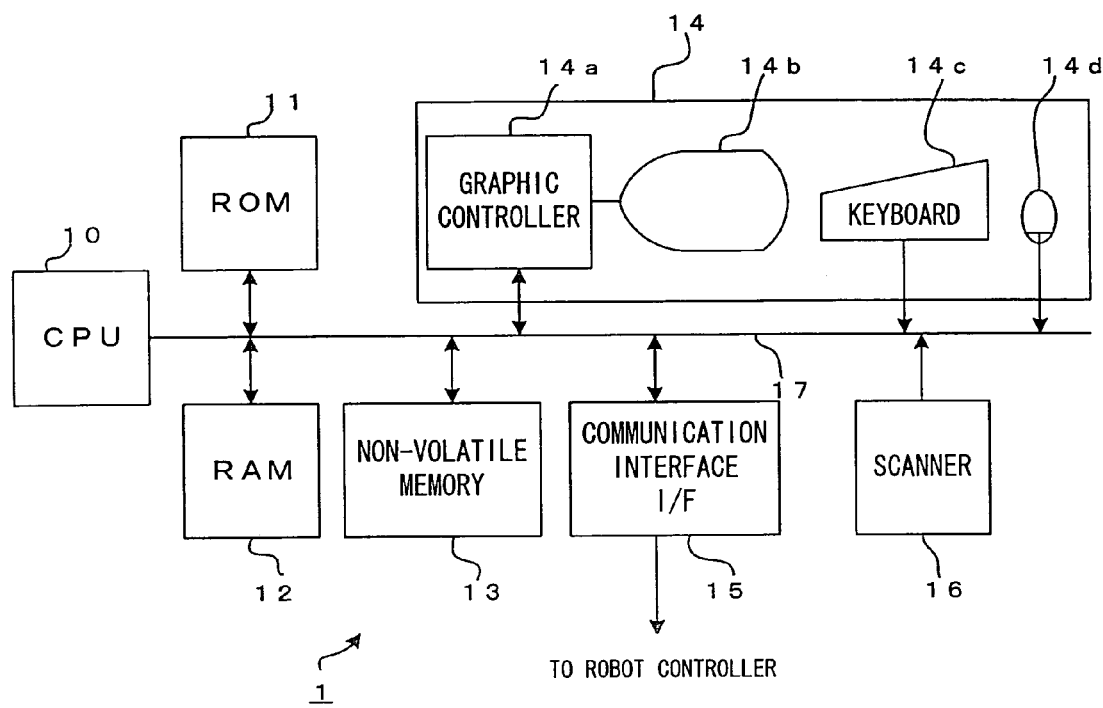
FIG. 1 is a block diagram showing an essential portion of an embodiment of a graphic display apparatus for a robot system of the present invention.

FIG. 1 is a block diagram showing an essential portion of a graphic display apparatus 1 for a robot system according to one embodiment of the present invention. The graphic display apparatus 1 for the robot system includes a processor 10. Connected to the processor 10 through a bus 17 are a ROM 11, a RAM 12, a battery-protected nonvolatile memory 13 comprising a CMOS memory, a display unit 14, a communication interface 15 connected to a robot controller and the like through a line of communication, a scanner 16 for capturing image, and the like.

The display unit 14 includes a graphic control circuit 14a, display means 14b comprising a liquid crystal display or a CRT, a keyboard 14c, a mouse 14d and the like. The graphic control circuit 14a, the keyboard 14c and the mouse 14d are connected to the bus 17.

In the present invention, 3-D models of various peripheral devices, machines and parts relating to robot motions are stored in advance in the nonvolatile memory 13. The examples of the various peripheral devices, machines and parts relating to robot motion of which 3-D models are created are an automobile and workpieces such as machine parts, which are directly operated by a robot, a peripheral device such as a tool automatic exchanging apparatus for automatically exchanging a tool of an end effector mounted to a tip of a robot arm, an end effector mounted to the tip of a robot arm, a jig, and a robot itself. In the following, such a robot, peripheral devices, machines and parts relating to robot motion are generally called "object".

Figure 8:
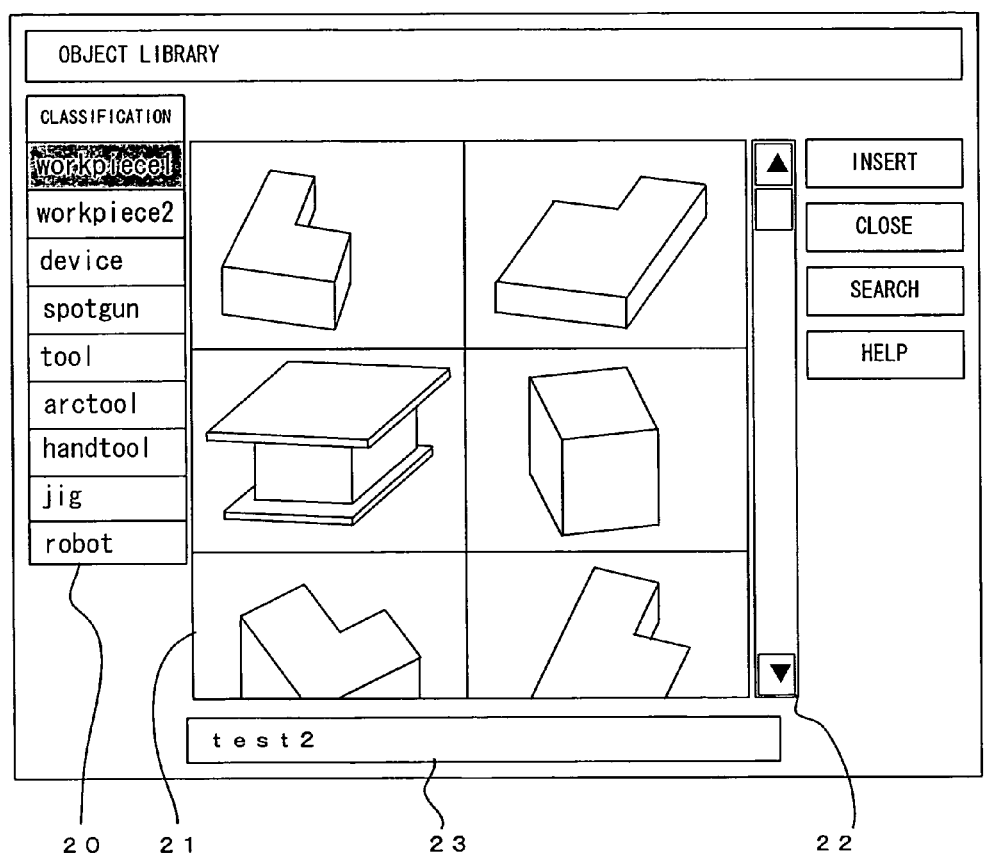
FIG. 8 is an explanatory diagram of an object library menu screen according to the embodiment.

Peripheral devices, machines and parts are classified by kinds, and 3-D models thereof are stored in the nonvolatile memory 13. In this embodiment, as shown in FIG. 8, assuming that there are a number of workpieces such machine parts which are directly operated by a robot, these workpieces are divided into two classes, i.e., "workpiece 1" and "workpiece 2", and a 3-D model of each workpiece (part) is stored. One class of "device" is allocated to machines such as peripheral devices. Machine end effectors mounted to the tip of a robot arm are classified into "spotgun" for spot guns, "arctool" for arc tools, "handtool" for hand tools, and "tool" for other tools. Further, classes of "jig" for jigs and "robot" for robots are also prepared, and the 3-D models of the objects are classified by kinds and stored.

Figure 2:
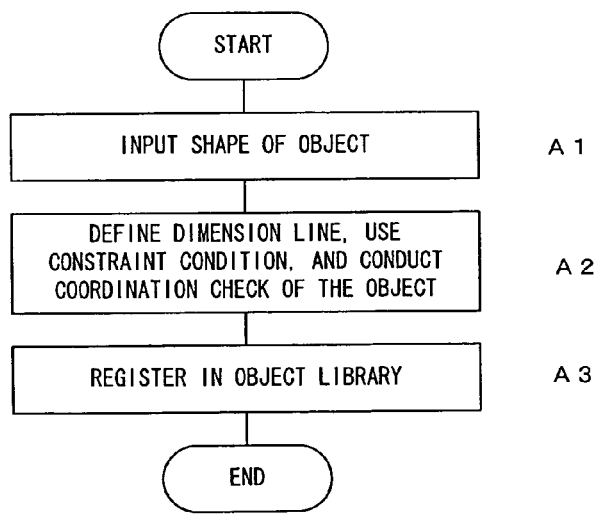
FIG. 2 is a flowchart showing a procedure for creating an object library according to the embodiment.

FIG. 2 is a flowchart showing an input procedure of shapes of the 3-D models of objects (peripheral devices, machines and parts). If an object 3-D model register mode is selected using the keyboard 14c, the processor 10 starts the processing shown in FIG. 2.

First, a message urging an operator to input a class and name of an object and a name and shape of a part is displayed. Then the operator, according to the message, inputs a class and name of an object and further a name of a part (if there are a plurality of parts for the object). And the operator inputs the shape of the object or part using a modeling system in a form defined by a polyhedron as in the conventional manner (step A1).

When inputting of the shape is completed, the operator inputs a definition of a dimension line with respect to the object and a constraint condition to be considered when the shape of the object is subjected to change (step A2). Definition of a dimension line is carried out by selecting an edge line at a position where the dimension of the object can be changed and setting a length of a leader line with respect to the dimension line and a color of the dimension line.

Figure 9:
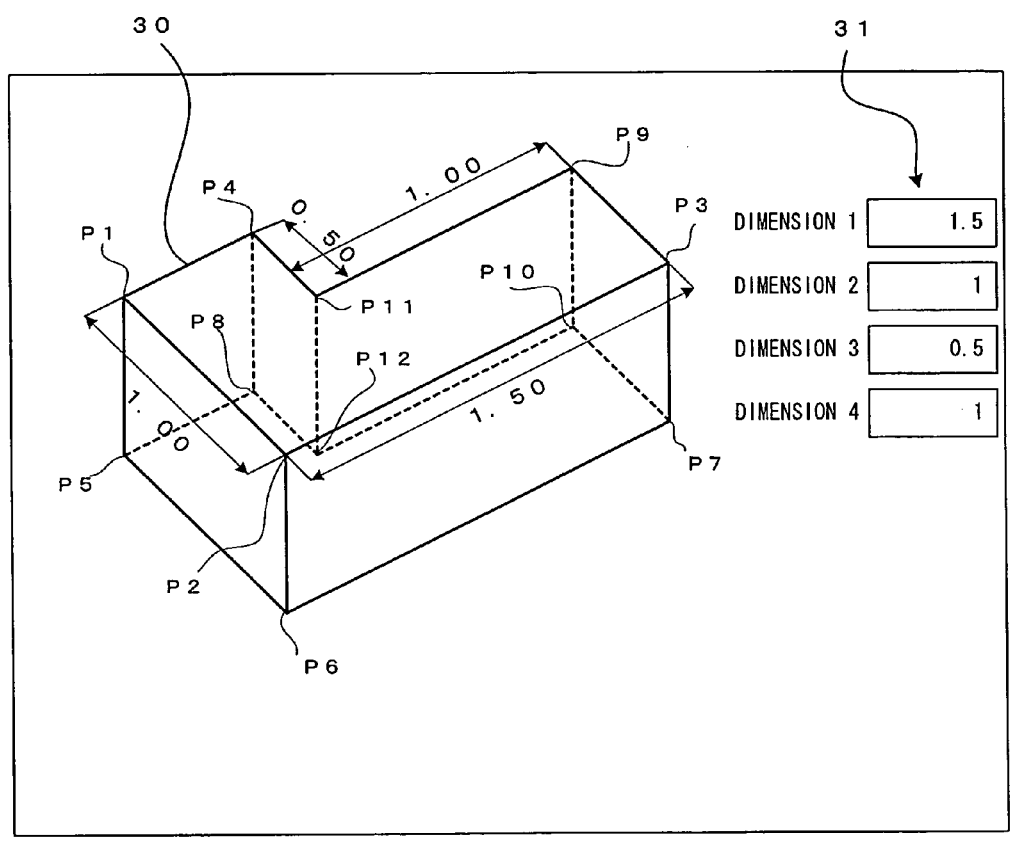
FIG. 9 is an explanatory diagram of a screen displaying a selected object model according to the embodiment.

For example, it is assumed that for an object 3-D model 30 shown in FIG. 9, an origin of coordinate systems is set at the apex P1, and the direction advancing from the apex P1 to the apex P4 is Y axis plus direction, the direction advancing from the apex P1 to the apex P2 is X axis plus direction, and the direction advancing from the apex P1 to the apex P5 is Z axis minus direction. Further, it is assumed that the shape of the object 3-D model 30 can change but its shape change is limited to only X and Y axes direction, not changing in Z axis direction. For this 3-D model 30, dimension lines are defined for edge lines which can change its length. FIG. 9 shows an example in which four dimension lines are defined between the apexes P2 and P3, between the apexes P1 and P2, between the apexes P4 and P11, and between the apexes P11 and P9.

A constraint condition which stipulates how the shape of an object has to be changed when a dimension of the object, set in advance with respect to the object, is changed is set. In this embodiment, as the 3-D model of an object is specified by the form of a polyhedron, a change in shape of the object means a change in a distance between the apexes. Accordingly, in this case, a constraint condition providing a mode of change in the position of the apexes of which coordinates are to be changed when the dimension is changed in association with the change of the shape.

In the example shown in FIG. 9, the constraint condition, in creating a shape, associated with the change in the length of the dimension line between the apex P1 and the apex P2 or change of the X axis coordinate value of the apex P2 provides that the X axis coordinate values of the apexes P3, P7 and P6 has to be changed. Thereupon, there is set a constraint condition providing that the X axis coordinate value of the apex P2 and the X axis coordinate values of the apexes P3, P7 and P6 are equal to each other. As the coordination check condition in this case, a condition providing that the X axis coordinate value of the apex P2 is greater than the X axis coordinate value of the apex P1 is set.

Similarly, the constraint condition associated with change in the dimension between the apexes P2 and P3 provides that the Y axis coordinate value of the apex P3 is equal to the Y axis coordinate values of the apexes P7, P9 and P10 is set. As the coordination check condition, a condition providing that the Y axis coordinate value of the apex P3 is greater than the Y axis coordinate value of the apex P2 is set.

The constraint condition associated with change in the dimension between the apexes P4 and P11 provides that the X axis coordinate value of the apex P11 is equal to the X axis coordinate values of the apexes P9, P10 and P12 is set. As the coordination check condition, a condition that the X axis coordinate value of the apex P11 is greater than the X axis coordinate value of the apex P4 is set.

The constraint condition associated with change in the dimension between the apexes P11 and P9 provides that the Y axis coordinate value of the apex P9 is equal to the Y axis coordinate values of the apexes P3, P7 and P10 is set. As the coordination check condition, a condition that the Y axis coordinate value of the apex P9 is greater than the Y axis coordinate value of the apex P11 is set.

When the shape of the object, the definition of the dimension line, the constraint condition and the coordination check condition are set in this manner, the processor 10 stores, in the nonvolatile memory 13, data for specifying the object shape and data for defining the dimension lines as the object library, based on the inputted data (step A3). The object name (object identifier), phase data, geometric data, dimension line data, constraint condition data, coordination check condition data are stored. The identifier is called ID, hereinafter.

Phase data such as name of a part (object ID), apex ID, and edge line ID, and relation between the phase data are stored. These phase data is obtained from the polyhedron shape of the 3-D model which is analogous to the object created in step A1.

An edge line formula with respect to the edge line ID stored as a phase data, a surface formula with respect to a surface ID, 3-D position data with respect to an apex ID are stored as the geometric data. The geometric data is also obtained from the polyhedron shape of the 3-D model which is analogous to the object created in step A1.

The dimension line data set in step A2 is stored as dimension line data, and this data is stored in the following manner:

"dim, object ID, part ID, apex ID, apex ID, direction of the dimension leader line, length of dimension leader line, color of dimension line".

For example, in the case of the dimension line between the apexes P1 and P2 shown in FIG. 9, dimension line data set in step A2 is:

"dim, test2, Text4, 1, 2, 1, -200, 2".

In the above formula, "dim" is a code defining the dimension line. "test2" is an object ID expressing an object name. "Text4" is a part ID expressing a part name. The next "1" and "2" represent the apexes P1 and P2, respectively. The arrangement of two apexes in the dimension line means the coordinate value of the former apex is not changed while the coordinate value (in the direction of command) of the latter apex is changed when a length of a dimension line is changed. In the above example, it means that the coordinate value of the apex P1 is not changed while the coordinate value of the apex P2 is changed. The next "1" represents a direction of the dimension leader line. In this case, "0" represents X axis direction, "1" represents Y axis direction, and "2" represents Z axis direction. The next "-200" represents a length of the dimension leader line, and the last "2" represents a code of a display color of the dimension line. In the above example, stored is data indicating that a dimension line is provided between the apexes P1 and P2 of the part "Text4" of the object "test2", a leader line of that dimension line has a length of 200 in the Y axis minus direction, and the leader line and the dimension line are displayed with a color corresponding to the code "2".

The constraint condition set in step A2 is stored in the form of following data:

"moveabs, object ID, part ID, apex ID, direction, apex ID, direction,".

For example, as a constraint condition in association with the dimension line between the apexes P1 and P2 shown in FIG. 9 provides that the X axis coordinate value of the apex P2 is equal to the X axis coordinate values of the apexes P3, P7 and P6, this constraint condition is stored in the following form.

"moveabs, test2, Text4, 2, 0, 3, 0
moveabs, test2, Text4, 2, 0, 7, 0
moveabs, test2, Text4, 2, 0, 6, 0".

In the above formulas, "moveabs" is a code of the constraint condition. "test2" and "Text4" are the object ID and the part ID, respectively. The next "2, 0, 3, 0" indicates apex P2, direction 0, apex P3, direction 0", respectively. As for the direction, "0" is X axis direction, "1" is Y axis direction and "2" is Z axis direction. Specifically, "2, 0, 3, 0" means that the X axis coordinate value of the apex P2 is equal to the X axis coordinate value of the apex P3.

The coordination check data is stored in the following manner:

"checkifgtpos, object ID, part ID, apex ID, direction, apex ID, direction,".

The above formula means that the coordination is fulfilled only when the value of the coordinate axis specified by the first "direction" of the apex specified by the first "apex ID" is greater than the value of the coordinate axis specified by the second "direction" of the apex specified by the second "apex ID". As for the direction, "0" indicates X axis direction, "1" indicates Y axis direction and "2" indicates Z axis direction.

In the above example, the above formula is specified in the following;

"checkifgtops, test2, Text4, 2, 0, 1, 0".

In the above formula, "checkifgtops" is a code of the coordinate check, and the latter portion "2, 0, 1, 0" indicates that in the case where the value of the X axis coordinate of the apex P2 is greater than the value of the X axis coordinate of the apex P1, it is determined that the coordinate is fulfilled and in other case, it is not determined so.

When the four dimension lines are set as shown in FIG. 9, the dimension line data, the constraint condition data and the coordination check data are stored in the object library in the following manner:

dim, test2, Text4, 1, 2, 1, -200, 2
moveabs, test2, Text4, 2, 0, 3, 0
moveabs, test2, Text4, 2, 0, 7, 0
moveabs, test2, Text4, 2, 0, 6, 0
checkifgtpos, test2, Text4, 2, 0, 1, 0
dimend, test2, Text4, 1, 2, 1, -200, 2
dim, test2, Text4, 2, 3, 0, 200, 2
moveabs, test2, Text4, 3, 1, 7, 1
moveabs, test2, Text4, 3, 1, 10, 1
moveabs, test2, Text4, 3, 1, 9, 1
checkifgtpos, test2, Text4, 3, 1, 2, 1
dimend, test2, Text4, 2, 3, 0, 200, 2
dim, test2, Text4, 4, 11, 1, 200, 2
moveabs, test2, Text4, 11, 0, 9, 0
moveabs, test2, Text4, 11, 0, 10, 0
moveabs, test2, Text4, 11, 0, 12, 0
checkifgtpos, test2, Text4, 11, 0, 4, 0
dimend, test2, Text4, 4, 11, 1, 200, 2
dim, test2, Text4, 11, 9, 0, -200, 2
moveabs, test2, Text4, 9, 1, 3, 1
moveabs, test2, Text4, 9, 1, 7, 1
moveabs, test2, Text4, 9, 1, 10, 1
checkifgtpos, test2, Text4, 9, 1, 11, 1
dimend, test2, Text4, 11, 9, 0, -200, 2

In the above formulas, "dimend" is a code defining the end of the constraint condition processing using the dimension lines.

The objects such as peripheral devices, machines and parts, which relate to the robot motion, are classified. The shapes, the dimension lines, the constraint condition and the coordination check data of the object are inputted as described above. And, the phase data, the geometric data, the dimension line data, the constraint condition data and the coordination check data, which are necessary for specifying the shape of an object, are stored in the nonvolatile memory 13 as an object library. When the object data was inputted in this manner, a reduced scale image of the object shape for menu display is formed based on the inputted object shape and is stored for the menu.

Figure 3:
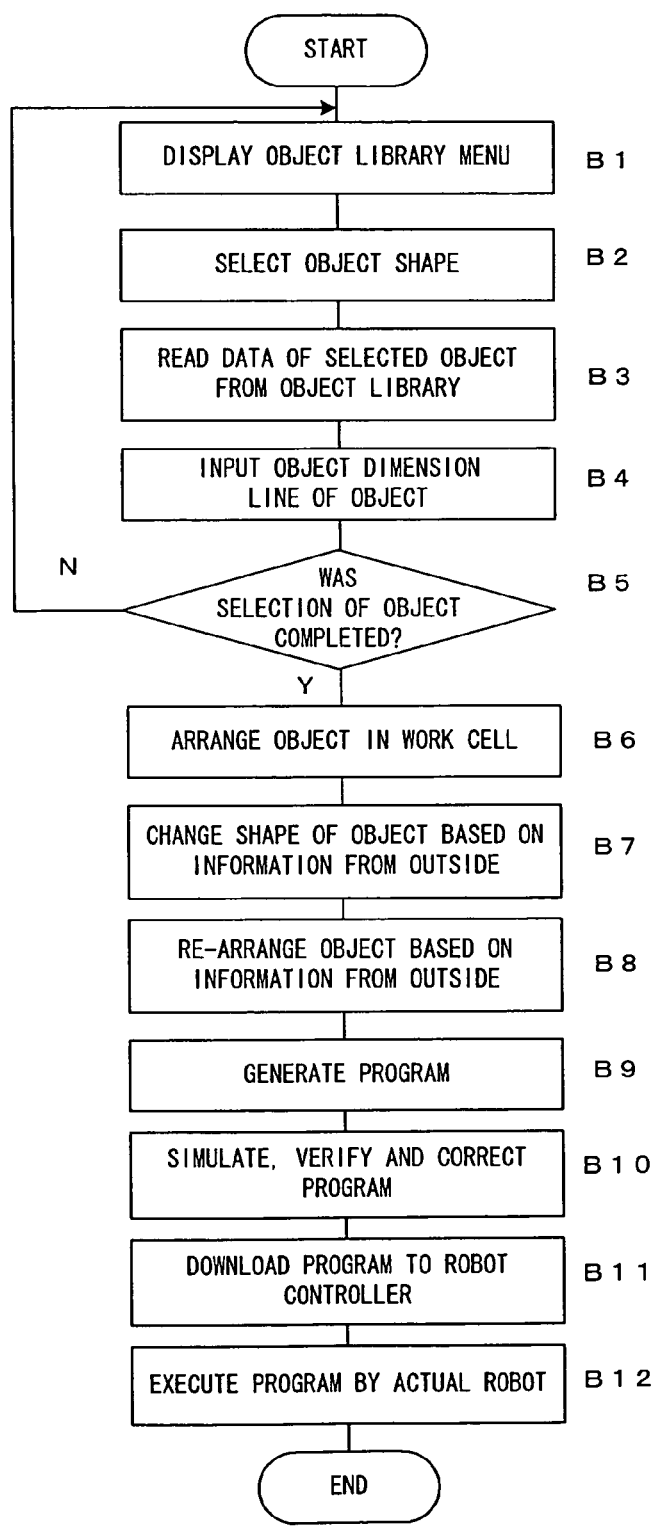
FIG. 3 is a flowchart showing a procedure of a modeling procedure according to the embodiment.

In a state in which the object library has been completed and inputted in this manner, the monitoring action is started. FIG. 3 is a flowchart showing a procedure of the monitoring procedure according to the embodiment.

If a modeling command is inputted from the keyboard, the processor 10 displays the object library menu on the display means 14b of the display unit 14 as shown in FIG. 8 (step B1). At the beginning, a first item "workpiece 1" is selected, and a shape menu of object (parts) 3-D models registered in the "workpiece 1" is displayed in the shape menu display column 21 in the central portion of the screen. Then, the operator selects a class of the object to be inputted from the class column 20 using the mouse 14 or a pointing device such as a cursor.

When each of the items in the class column 20 is selected, the shape menu of the 3-D model of the object corresponding to the selected class item is displayed in the shape menu display column 21.

For example, if "workpiece 1" is selected, a shape menu of 3-D models of workpieces (parts) registered as the "workpiece 1" in this class is displayed in the shape menu display column 21. If a class item "spotgun" is selected, a shape menu of 3-D models of registered spot guns is displayed in the shape menu display column 21. If a class item "robot" is selected, a shape menu of 3-D models of registered robots is displayed in the shape menu display column 21.

Then, the operator selects a class item to have the shape menu of 3-D models of the object relating to the item displayed, operates a scroll bar 22 to scroll a screen of the shape menu display column 21, and selects a menu screen corresponding to a shape of the object to be inputted using the mouse 14d or the like. In the example shown in FIG. 8, an object name "test2" of the "workpiece1" has been selected, and the selected object ID is displayed in the selection column 23 (step B2).

If the object 3-D model is selected in this manner, the processor 10 reads data of the selected object 3-D model data from the object library stored in the nonvolatile memory 13 and stores the data in the RAM 12. Then the processor 10 displays a shape of the selected object 3-D model based on the phase data and geometric data of the object 3-D model, and further displays dimension lines and dimension leader lines based on the dimension line data (step B3). Further, the processor 10 calculates a length of an edge line corresponding to the set dimension line data using the apex coordinate position data in the stored geometric data, and displays the length of the edge line in the dimension line inputting column corresponding to the dimension line data, as shown in FIG. 9.

In FIG. 9, a reference numeral 30 represents a shape of a selected object 3-D model, and a reference numeral 31 represents numeral value inputting columns which can change the shape or dimension of the displayed object 3-D model. Although FIG. 3 illustrates the symbols of the apexes "P1" to "P12", these symbols are not displayed on the screen in practice. However, the data of these apexes P1 to P12 is stored as an object library. In the dimension numerical value inputting column 31, displayed are lengths of dimension lines, or lengths of the distance between apexes, obtained from the shape of the object created when the object library was formed.

The operator inputs a value corresponding to the dimension of the actual object which is actually used. In this case, if the operator selects one of numerical value inputting columns 31 using the mouse 14d, colors of the dimension line and dimension leader line corresponding to the selected column 31 are changed, so that the operator can discriminate the edge line selected. For example, in FIG. 9, if the column of "dimension 1" is selected, an edge line between the apexes P2 and P3 corresponding to this column is selected and colors of the dimension line showing its length and dimension leader line are changed. If the operator inputs an actual dimension of the edge line of object of which color has been changed, this inputted dimension is displayed in the corresponding column 31.

There exists an order for input of change of dimension. If the position of an apex determined by the length of a dimension line which was inputted earlier does not coincide with the position of the same apex determined by the length of another dimension line which was inputted lately, the position of the apex determined based on the length of a dimension line which was inputted lately takes precedence. For example, if, after input of the numerical value of a dimension line (dimension 1) between the apexes P2 and P3, the numerical value of a dimension line (dimension 4) between the apexes P11 and P9 is inputted, then Y axis coordinate value of the apexes P3, P7, P9, P10 has to be the same value. However, if these values are not same, the Y axis coordinate values of the related apexes are changed based on the dimension (dimension 4) between the apexes P11 and P9.

When input of the numerical value (dimension) of an edge line of which dimension is to be changed is completed, the processor 10 calculates a coordinate position of each apex based on the constraint condition data stored as data of object 3-D model, and changes a coordinate value of the apex, which corresponds to the data of the object 3-D model which was read from the object library and is stored in the RAM 12. A displayed shape is also changed based on the newly inputted dimension value (step B4).

The procedures of steps B1 to B5 are carried out for the robot and all other objects relating the robot motion. Data of 3-D model of a robot body, and data of 3-D models of peripheral devices, machines and parts which relate to the robot motion are read from the object library. The dimensions of the object 3-D model data, which is to be changed, are changed according to the above-described procedure, while the dimensions which is to be remained without change are stored in the RAM 12 as they are after being read out of the object library.

When all the object 3-D model data relating to the robot motion are read and the dimension changing procedure is completed (step B5), a procedure for arranging the 3-D model of an object in a work cell where the robot system is disposed is carried out (step B6).

Figure 4:
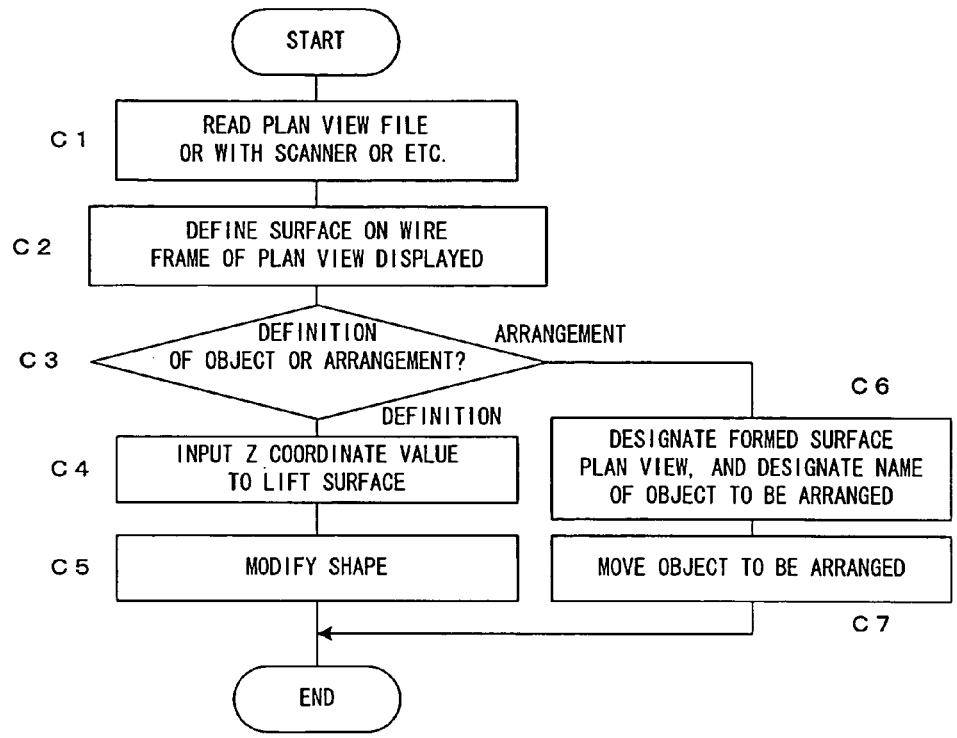
FIG. 4 is a flowchart showing a procedure for arranging the model of an object to a work cell according to the embodiment.

The procedure for arranging the 3-D model of the object in the work cell is shown in FIG. 4.

A plan view of a layout of the work cell is read and displayed (step C1). There are many ways for reading out the plan view of the layout. In the case of the example shown in FIG. 4, a plan view may be read, through the communication interface 15, from a plan view file which was generated using a CAD or the like and stored. A plan view may be read from storing medium such as a floppy disc through a driver (not shown). Further, a layout plan view drawn in a paper may be read using the scanner 16. Accordingly, a plan view of the layout of the work cell can be read using any one of the three methods and displayed on the display means 14*b* of the display unit.

Figure 10:
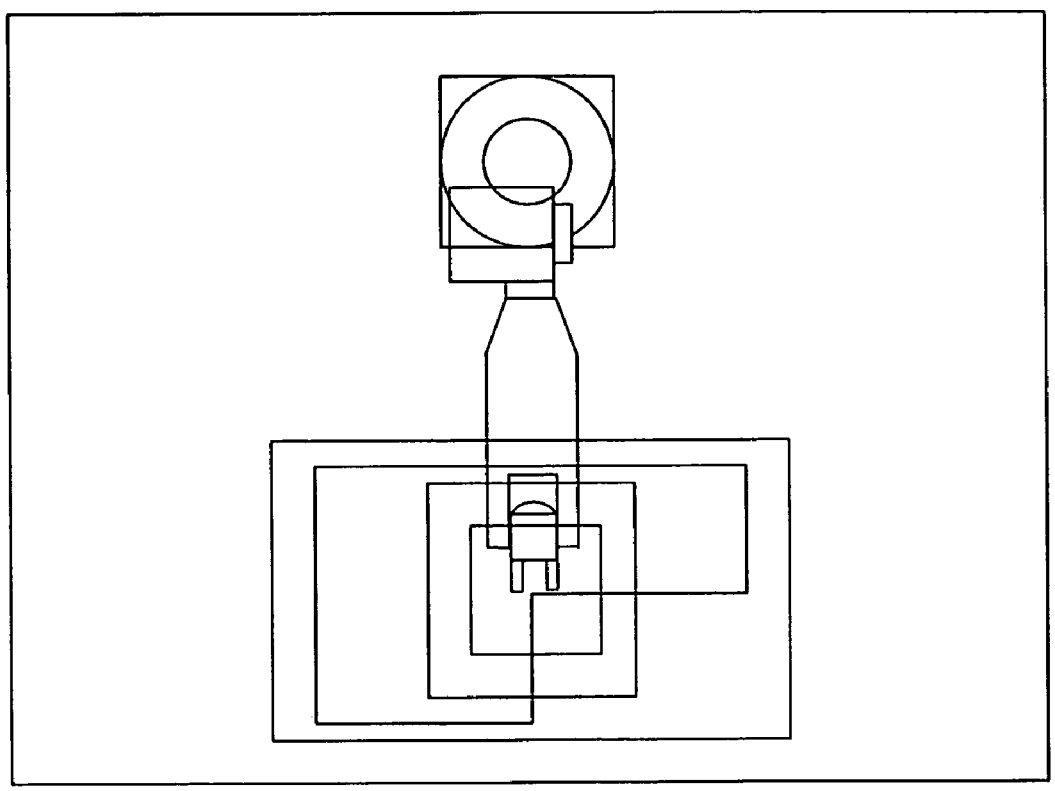
FIG. 10 is a plan view of a work cell of the embodiment.

FIG. 10 shows one example of the plan view of the layout of the work cell, showing plan views of the layout of the robot, table, workpiece and the like when the robot carries out the arc welding. Such a plan view is read and displayed on the display means 14*b*.

Next, three points on a wire frame of the displayed plan view are designated to form a surface on an object image. Alternatively, three points on the wire frame are designated and a closed polygon including the three points is searched. If a closed polygon is found by the search, a surface is formed by this polygon (step C2).

Next, the operator inputs the object definition command when defining the object on the plan view, while the operator inputs an object arranging command when arranging the 3-D model which had been read from the object library and of which dimension has been adjusted (step C3).

When defining the object, the operator designates a surface formed on the plan view and inputs a value of the Z axis coordinate which is the height direction. In consequence the designated surface is lifted by the designated value in the Z axis direction. And this coordinate value relating to the designated surface lifted is stored (step C4). A shape of the lifted surface is modified (step C5), thus completing this procedure.

When arranging the 3-D model of the object, on the other hand, a surface formed on the plan view is designated, and the name of the object (object ID) of which 3-D model is to be arranged is inputted on the surface (step C6). The processor 10 causes the 3-D model of the designated object to move to the designated surface position (step C7). If definitions are to be carried out for a plurality of objects or arrangement of models are to be carried out for a plurality of objects, the procedures in steps C3 to C7 are repeated.

When arrangement of the 3-D models of the objects in the work cell is completed, the procedure returns to FIG. 3, and shape changing processing for the object 3-D model is carried out based on information from outside (step B7).

Figure 5:
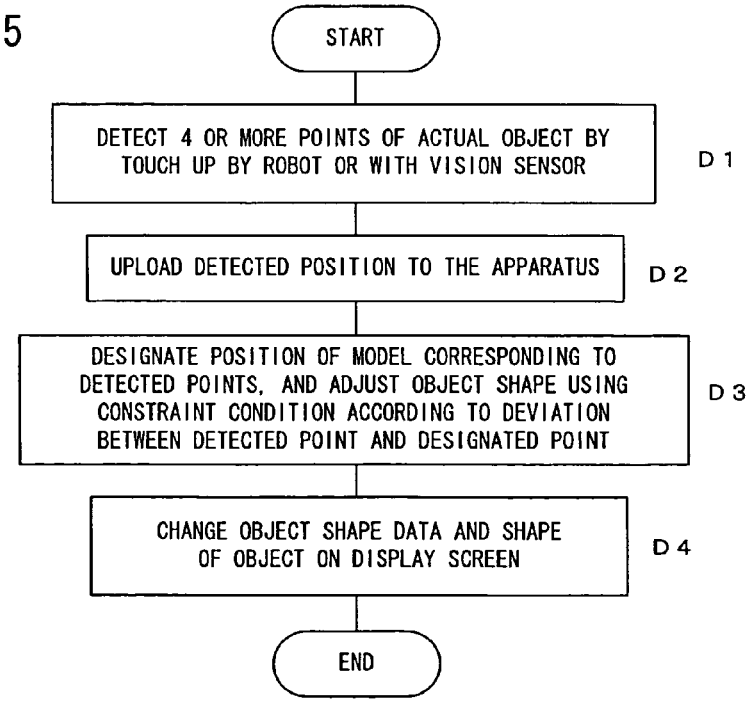
FIG. 5 is a flowchart showing shape changing processing for an object 3-D model according to the embodiment.

FIG. 5 is a flowchart showing shape changing processing for the object 3-D model shape. Moving a tool center point (TCP) mounted to the tip of the arm of an actual robot and positioning the TCP at four or more points which form physical features of the actual object, the coordinate positions of these four or more points are detected with touch up on these points. In case where a vision sensor is used, on the other hand, the positions of the four or more points which form physical features of the actual object are detected using the sensor (step D1). The position data of the detected four or more points are uploaded to the graphic display apparatus for robot system 1 (step D2).

The graphic display apparatus for robot system 1 designates the positions of the object 3-D models corresponding to the positions of the received four or more points, obtains a deviation between the positions of the detected points and the positions on the designated 3-D model, and adjusts the positions of each apex of the 3-D model, using the above-described constraint condition, so that the coordinate position of the designated point corresponds to the position of the detected point (step D3).

Based on the apex position obtained in this manner, the phase data, the geometric data, the dimension line data and the like stored in the RAM 12 are changed and the shape of the object 3-D model to be displayed on the display means 14*b* are also changed (step D4), so that the shapes of the displayed object 3-D models may coincide with the shape of the actual object. Then, this shape changing processing for the object 3-D model is completed.

When the shape modification of the object 3-D model is completed, rearrangement processing for the 3-D model is carried out based on information from outside (step B8). This processing is carried out for correcting a deviation between the arrangement position of the object 3-D model and that of the actual object. This processing is carried out according to the procedure shown in FIG. 6 or 7.

Figure 6:
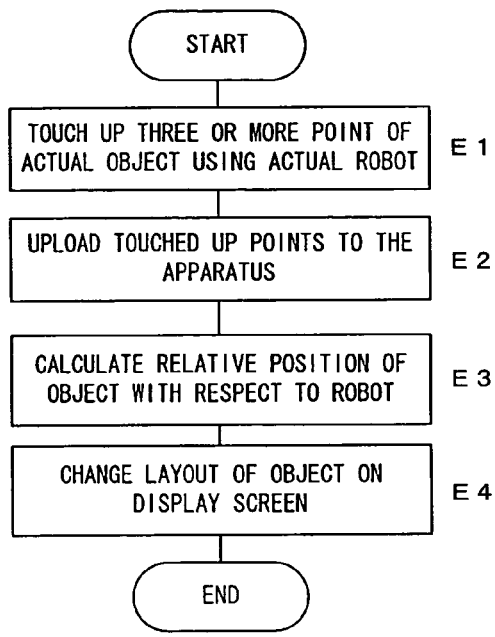
FIG. 6 is a flowchart showing a procedure for rearranging the object by touch up by a robot according to the embodiment.

In the method shown in FIG. 6, the tool center point (TCP) mounted to the tip of a robot arm is caused to move and touching up (positioning) by the TCP is carried out on three or more points of the actual object. Information on the points touched up is transmitted to the graphic display apparatus for robot system 1 through a communication line (steps E1 and E2).

The graphic display apparatus 1, on the other hand, obtains a relative position of the object with respect to the robot from the received positions of the three points (step E3) and change the layout of the object 3-D model on the display screen based on the obtained relative position (step E4).

Figure 7:
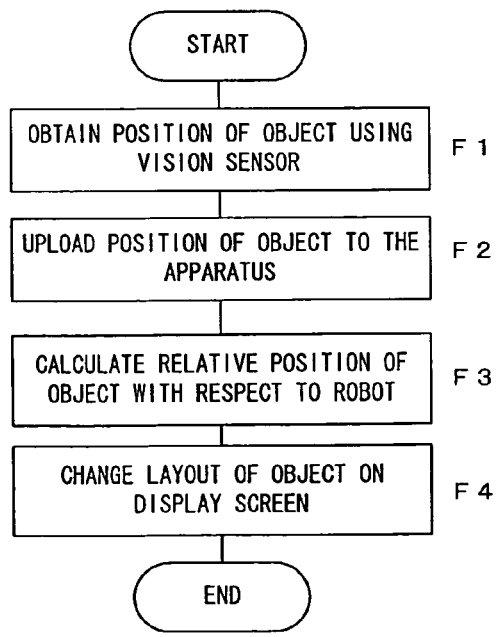
FIG. 7 is a flowchart showing a procedure for rearranging the object using a vision sensor according to the embodiment.

In the case of the method shown in FIG. 7 which uses a vision sensor, a position and a posture of the object are obtained by the vision sensor, and the obtained position and the posture are transmitted to the graphic display apparatus 1 (steps F1 and F2). The graphic display apparatus 1 obtains a relative position of the object with respect to the robot based on the received position and the posture (step F3), and changes the layout of the object 3-D model on the display screen based on the relative position obtained in this manner (step F4).

Through the above procedures, shapes and layout of the 3-D models of the objects such as the robot, the peripheral devices, the machines and the parts, which are displayed on the display means 14*b* of the display unit 14, and shapes and layout of the actual object substantially coincide with each other.

Thereafter, a motion program of the robot is generated in the conventional manner (step B9) and the motion program is then verified by carrying out a simulation of the motion program, moving the robot 3-D model displayed on the screen in animation in the conventional manner. Then the motion program is modified if required so. In this manner, the motion program is completed (step B10).

The motion program thus generated is downloaded to the robot controller through the communication interface 15 and the communication line (step B11). The robot controller, on the other hand, executes the downloaded motion program (step B12).

In the above embodiment, one standard type (shape) of robot is stored in advance for each kinds of robots in the object library in the form of a 3-D model. And, a robot 3-D model stored in the object library is selected in accordance with a kind or type (shape) of a robot to be used, and the dimensions of the selected model are set to form a 3-D model of the actual robot to be used. However, when there is no change in the robot to be used, a 3-D model of the robot to be used may be directly read from the object library where the 3-D model of the robot has been stored, without newly creating the 3-D model of the robot.

When a robot, a peripheral device, a machines or a part which has not been registered in the object library is newly requested for use, a 3-D model of the newly requested object is added to the object library according to the processing shown in FIG. 2 so as to cope with the change of a robot, a peripheral device, a machine or a part (workpiece).

According to the present invention, it is possible to easily create shape models of a robot itself and/or peripheral devices, machines or parts, which relate to robot operation, which are displayed and caused to move on the screen in animation.

What is claimed is:

1. A graphic display apparatus for a robot system comprising:
   means for displaying and arranging a 3-D model of a robot on a display screen to cause the displayed model to move in animation on the screen;
   means for storing the 3-D model of the robot and one or more 3-D models of a peripheral equipment, a machine, or a part, which is used in a system using the robot; and
   means for selecting one or more of the 3-D models stored in said storing means on the display screen, wherein
   the 3-D model of the robot, or the 3-D model of the robot and the 3-D model of a peripheral equipment, a machine, or a part, which was selected by said selecting means, are displayed and arranged on the display screen, with at least a part of the system using the robot being approximated, and
   3-D models of said peripheral equipment, said machine, or said part are classified by kinds, a plurality of different types are displayed on the screen for each of the classified kinds, and a 3-D model is selected from among the displayed types.

2. The graphic display apparatus for a robot system according to claim 1, further comprising means for displaying, on the screen, the robot motion corresponding to at least a part of a robot program, in animation.

3. A graphic display apparatus for a robot system comprising:
   means for displaying and arranging a 3-D model of a robot on a display screen to cause the displayed model to move in animation on the screen;
   means for storing the 3-D model of the robot and one or more 3-D models of a peripheral equipment, a machine, or a part, which is used in a system using the robot; and
   means for selecting one or more of the 3-D models stored in said storing means on the display screen; and
   means for adjusting dimensions of the 3-D model, selected by said selecting means, on the screen, wherein
   the 3-D model of the robot of which dimensions were adjusted by said adjusting means, or the 3-D model of the robot and the 3-D model of a peripheral equipment, a machine, or a part, which was selected by said selecting means, of which dimensions were adjusted by said adjusting means, are displayed and arranged on the display screen, with at least a part of the system using the robot being approximated.

4. The graphic display apparatus for a robot system according to claim 3, wherein a plan view of layout of an operation system using the robot is displayed on the display screen and the 3-D model of the peripheral equipment, the machine, or the part is arranged on the display screen in correspondence with the layout, to carry out modeling of a production system using the robot.

5. The graphic display apparatus for a robot system according to claim 3, further comprising means for sending information to and receiving information from a robot controller, wherein the shape of the 3-D model of the peripheral equipment, the machine, or the part, is adjusted based on position data which forms a physical feature of the actual peripheral equipment, the machine, or the part, sent from the robot controller through said information sending and receiving means.

6. The graphic display apparatus for a robot system according to claim 3, further comprising means for adding a 3-D model of the peripheral equipment, the machine, or the part of the robot in said storing means.

7. A graphic display apparatus for a robot system comprising:
   means for displaying and arranging a 3-D model of a robot on a display screen to cause the displayed model to move in animation on the screen;
   first storing means for storing the 3-D model of the robot;
   second storing means for storing one or more 3-D models of a peripheral equipment, a machine, or a part, which is used in a system using the robot;
   means for selecting one or more of the 3-D models stored in said second storing means on the display screen; and
   means for adjusting a dimension of the 3-D model selected by said selecting means, on the screen, wherein
   the 3-D model of the robot, and the 3-D model of the peripheral equipment, the machine, or the part, which was selected by said selecting means, of which dimensions were adjusted by said adjusting means, are displayed and arranged on the display screen with at least a part of the system using the robot being approximated.

8. The graphic display apparatus for a robot system according to claim 7, further comprising storing means for storing constraint conditions which stipulate the coordination among numerical values of a plurality of position data which constitute each 3-D model stored in the second storing means, wherein when the dimension of the 3-D model selected by said selecting means is adjusted by said adjusting means, coordination among the numerical values of a plurality of position data which constitute the 3-D model is considered using the constraint conditions stored in said constraint condition storing means.

9. The graphic display apparatus for a robot system according to claim 7, wherein when the dimension of the 3-D model selected by said selecting means is adjusted by said adjusting means, coordination among the numerical values of a plurality of position data which constitute the 3-D model selected is considered.

10. A graphic display apparatus for a robot system, comprising:
    a displaying and arranging unit to display and arrange one or more 3-D models of the robot system on a display screen to cause the one or more displayed 3-D model to move in animation;
    a storing unit to store the one or more 3-D models; and
    a selecting unit to select the one or more of the stored 3-D models that is displayed on the display screen,
    wherein the one or more 3-D models, which was selected by the selecting unit, is displayed and arranged on the display screen according to constraint conditions relating to at least one dimension line of the one or more 3-D models of the robot system.

11. A graphic display apparatus for a robot system, comprising:
- a displaying and arranging unit to display and arrange a 3-D model of a robot on a display screen to cause the displayed model to move in animation on the screen;
- a storing unit to store the 3-D model of the robot and one or more 3-D models of a peripheral equipment, a machine, or a part, which is used in a system using the robot; and
- a selecting unit to select one or more of the 3-D models stored in the storing unit on the display screen,
- wherein the 3-D model of the robot, or the 3-D model of the robot and the 3-D model of a peripheral equipment, a machine, or a part, which was selected by the selecting unit, are displayed and arranged on the display screen, with at least a part of the system using the robot being approximated, and
- wherein the 3-D models of said peripheral equipment, said machine, and/or said part are classified by kinds, a plurality of different types are displayed on the screen for each of the classified kinds, and a 3-D model is selected from among the displayed types.

12. A graphic display apparatus for a robot system, comprising:
- a displaying and arranging unit to display and arrange a 3-D model of a robot on a display screen to cause the displayed model to move in animation on the screen;
- a storing unit to store the 3-D model of the robot and one or more 3-D models of a peripheral equipment, a machine, or a part, which is used in a system using the robot;
- a selecting unit to select one or more of the 3-D models stored in the storing unit on the display screen; and
- an adjusting unit to adjust dimensions of the 3-D model, selected by the selecting unit, on the screen,
- wherein the 3-D model of the robot of which dimensions were adjusted by the adjusting unit, or the 3-D model of the robot and the 3-D model of a peripheral equipment, a machine, or a part, which was selected by the selecting unit, of which dimensions were adjusted by the adjusting unit, are displayed and arranged on the display screen, with at least a part of the system using the robot being approximated.

13. A graphic display apparatus for a robot system, comprising:
- a displaying and arranging unit to display and arrange a 3-D model of a robot on a display screen to cause the displayed model to move in animation on the screen;
- a first storing unit to store the 3-D model of the robot;
- a second storing unit to store one or more 3-D models of a peripheral equipment, a machine, or a part, which is used in a system using the robot;
- a selecting unit to select one or more of the 3-D models stored in the second storing unit on the display screen; and
- an adjusting unit to adjust a dimension of the 3-D model selected by the selecting unit, on the screen,
- wherein the 3-D model of the robot, and the 3-D model of the peripheral equipment, the machine, or the part, which was selected by the selecting unit, of which dimensions were adjusted by the adjusting unit, are displayed and arranged on the display screen with at least a part of the system using the robot being approximated.

* * * * *

UNITED STATES PATENT AND TRADEMARK OFFICE
CERTIFICATE OF CORRECTION

| | | |
|---|---|---|
| PATENT NO. | : 7,002,585 B1 | Page 1 of 1 |
| APPLICATION NO. | : 09/688042 | |
| DATED | : February 21, 2006 | |
| INVENTOR(S) | : Atsushi Watanabe et al. | |

It is certified that error appears in the above-identified patent and that said Letters Patent is hereby corrected as shown below:

Title page item [56] References Cited
Column 2 (Foreign Patent Documents), Line 1, after "7/1994" insert - - G0B/19/405 - -.
Column 2 (Foreign Patent Documents), Line 2, after "3/1994" insert - - G09B/9/00 - -.
Column 2 (Foreign Patent Documents), Line 3, after "10/1985" insert - - G05B 19/42 - -.
Column 2 (Foreign Patent Documents), Line 4, after "8/1997" insert - - G05B 19/4061 - -.
Column 2 (Foreign Patent Documents), Line 5, after "4/2001" insert - - B23K 09/127 - -.
Page 2, Column 2 (Other Publications, Line 1, delete "porgramming" and insert
- - programming - - therefor.
Page 2, Column 2 (Other Publications, Line 2, after "operations"" delete "," and insert
- - . - - therefor.
Column 4, Line 3, delete "are" and insert - - is - - therefor.
Column 6, Line 3, after "form" delete "." and insert - - : - - therefor.
Column 6, Line 28, after "following" delete ";" and insert - - : - - therefor.
Column 7, Line 67, delete "FIG. 3" and insert - - FIG. 9 - - therefor.

Signed and Sealed this

Twenty-ninth Day of August, 2006

JON W. DUDAS
*Director of the United States Patent and Trademark Office*